United States Patent
Stevens et al.

(10) Patent No.: US 9,009,985 B2
(45) Date of Patent: Apr. 21, 2015

(54) PROBE DEPLOYMENT MECHANISM OF MEASURING MACHINE WITH ISOLATED LOCATOR COUPLING

(71) Applicant: Quality Vision International, Inc., Rochester, NY (US)

(72) Inventors: William E. Stevens, Byron, NY (US); Jason Patti, Rochester, NY (US); David E. Lawson, Webster, NY (US)

(73) Assignee: Quality Vision International, Inc., Rochester, NY (US)

( * ) Notice: Subject to any disclaimer, the term of this patent is extended or adjusted under 35 U.S.C. 154(b) by 207 days.

(21) Appl. No.: 13/873,324

(22) Filed: Apr. 30, 2013

(65) Prior Publication Data

US 2014/0317941 A1   Oct. 30, 2014

(51) Int. Cl.
 *G01B 5/012* (2006.01)
 *G01B 21/04* (2006.01)
(52) U.S. Cl.
 CPC .............. *G01B 21/047* (2013.01); *G01B 5/012* (2013.01)
(58) Field of Classification Search
 CPC ....... G01B 5/008; G01B 5/012; G01B 21/047
 USPC ........................................... 33/503, 556, 559
 See application file for complete search history.

(56) References Cited

U.S. PATENT DOCUMENTS

| | | | | |
|---|---|---|---|---|
| 4,780,961 A | * | 11/1988 | Shelton et al. | 33/503 |
| 4,848,004 A | | 7/1989 | Wilkins | |
| 5,173,613 A | * | 12/1992 | Henry et al. | 33/503 |
| 5,902,928 A | | 5/1999 | Chen et al. | |
| 7,676,945 B2 | * | 3/2010 | Prestidge et al. | 33/559 |
| 8,316,728 B2 | | 11/2012 | Lawson et al. | |
| 8,320,322 B2 | * | 11/2012 | Masaoka | 370/330 |
| 8,578,619 B2 | * | 11/2013 | Nakajima | 33/503 |
| 8,676,533 B2 | * | 3/2014 | Wooldridge et al. | 702/141 |
| 2002/0124636 A1 | | 9/2002 | Massie et al. | |
| 2008/0196521 A1 | | 8/2008 | Chiang | |
| 2011/0120240 A1 | | 5/2011 | Lawson et al. | |

OTHER PUBLICATIONS

International Search Report and Written Opinion of the International Searching Authority in corresponding International Application No. PCT/US2014/031285, mailed Aug. 26, 2014 (16 pages).

* cited by examiner

*Primary Examiner* — G. Bradley Bennett
(74) *Attorney, Agent, or Firm* — Brian B. Shaw, Esq.; Thomas B. Ryan; Harter Secrest & Emery LLP

(57) ABSTRACT

A probe deployment mechanism of a coordinate measuring machine provides for extending and retracting a probe. The probe is displaceable with respect to the actuator body connected to the measuring machine. A locator coupling secures the probe to the actuator body at the extended position for taking measurements. A drive coupled to the probe displaces the probe between the extended and retracted positions but at the extended position, the drive is releasable from the probe for kinetically isolating the locator coupling.

29 Claims, 10 Drawing Sheets

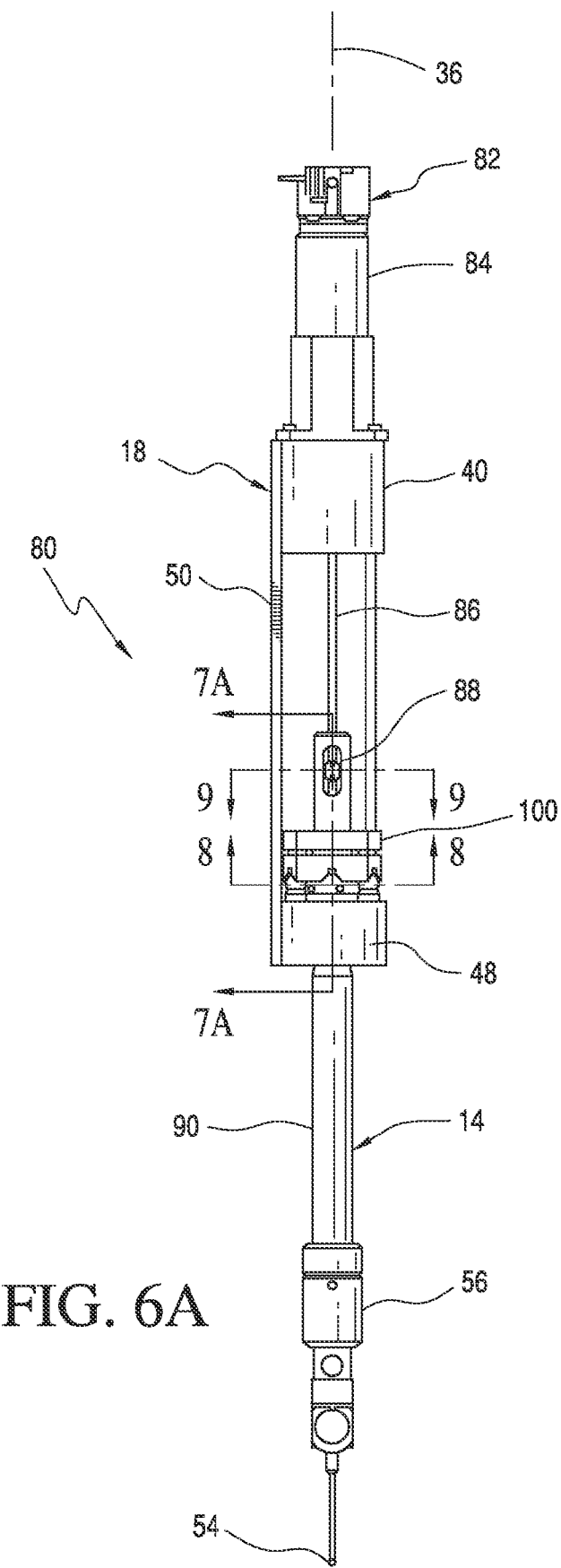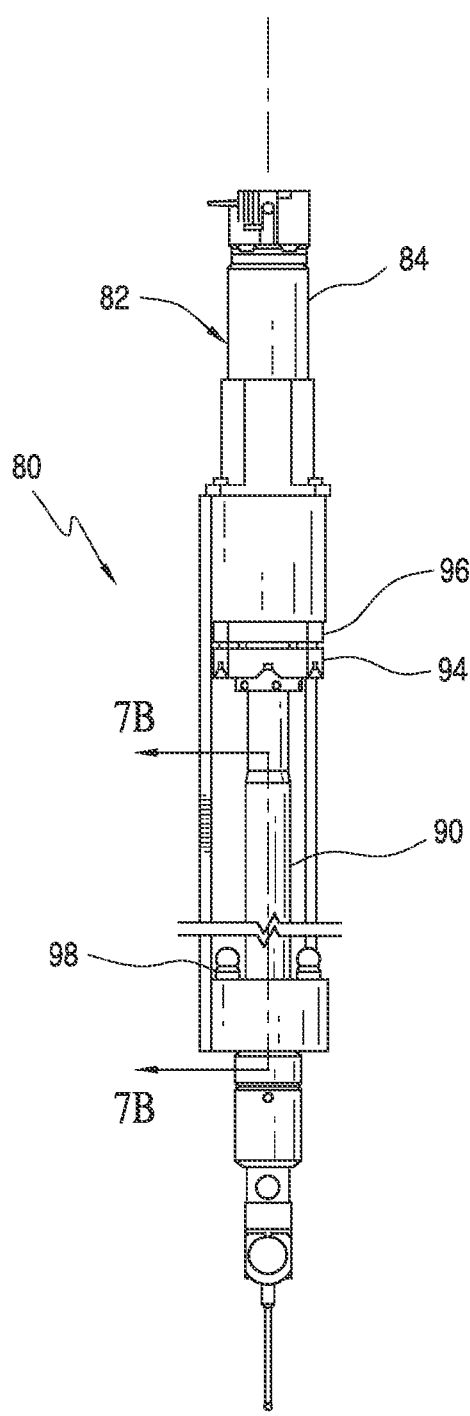
FIG. 6A
FIG. 6B

PROBE DEPLOYMENT MECHANISM OF MEASURING MACHINE WITH ISOLATED LOCATOR COUPLING

TECHNICAL FIELD

This application relates generally to touch probes used in coordinate measuring machines and more particularly to touch probes of compact designs that can be deployed, retracted, and redeployed to provide repeatable measurements.

BACKGROUND OF THE INVENTION

Touch probes of coordinate measuring machines provide points of contact with test objects for measuring a succession of points on the test objects generally referenced to the coordinate axes of the measuring machine. Typically, different points on a test surface of the test object are measured by relatively moving the probe with respect to the test object. The relative motion can be achieved by moving the probe, moving the test object, or both. Motions along or about the coordinate axes are typically measured to record positions of the probe at the different points of contact.

Coordinate measuring machines of this type can be fitted with mechanisms for retracting the probes when not in use. For example, the probes can be retracted to provide clearance for removing the test objects, for mounting new test objects, or for repositioning the probe to measure different portions of the same test objects. In addition, the probes can be retracted for performing other types of measurements, e.g., optical measurements, within a compound measuring machine, such as an optical imaging measuring machine combined with a coordinate measuring machine for collecting area data in addition to point-by-point data regarding the test objects.

An example of a retractable probe is described in U.S. Pat. No. 8,316,728 of Lawson et al., which is hereby incorporated by reference. A deployment mechanism for retracting and extending the probe includes a lead screw that moves the probe into and out of engagement with a kinematic mount. Although the kinematic mount is designed for positioning the probe, forces exerted by the retractor mechanism can prevent the probe from seating in exactly the same position each time it is deployed. Relatively small lateral forces acting over the length of the lead screw can produce an asymmetric distribution of forces at the kinematic mount, which can interfere with the accurate seating of the probe on the mount.

SUMMARY OF THE INVENTION

The invention as described in one or more of its preferred embodiments as a deployable probe mechanism of a coordinate measuring machine, includes an actuator body, a retractable probe, a locating coupling for connecting the probe to the actuator body in the deployed position, and a drive releasably coupled to the probe for extending the probe into the deployed position so that in the deployed position, the drive is kinetically isolated from the probe. The actuator body preferably includes a guide bearing for limiting translation of the probe to a single axis, but is disengageable from the probe at the deployed position to isolate the locator coupling from guiding means of the probe. Preferably, a magnetic clamp secures the locator coupling together in the deployed position to limit the mechanical connection between the probe and the actuator body to the locator coupling. The isolation of the locator coupling from any kinematic effects of the drive and guide, as well as from any further mechanical constraints, provides for improving the accuracy and repeatability with which the probe can be redeployed between measurements.

Preferably, the probe is displaceable along a vertical axis between retracted and extended (deployed) positions, and the drive suspends the probe from the actuator body in variable positions along the vertical axis under tension. A biasing force, such as gravity, preferably urges the probe toward the extended position, and the drive exerts a counteracting force on the probe for controlling a rate at which the probe is displaced between the extended and retracted positions. The drive is preferably arranged to be overdriven in the extended position for relieving the tension between the drive and the probe. For example, the drive can be arranged to be driven in a first direction through a first distance that permits the probe to be displaced from the retracted position to the extended position at which the locator coupling is engaged to prevent further displacement of the probe in the first direction, and the drive can be overdriven in the first direction at the extended position of the probe through second distance that would otherwise permit further displacement of probe in the first direction for thereby releasing the drive from the probe.

The guide bearing can be connected to the actuator body for confining translation of the probe to a single vertical axis throughout a first portion of a range of motion between extended and retracted positions while being disengaged from the probe at the extended position for kinetically isolating the probe from the guide bearing. For example, the guide bearing can be arranged to engage a periphery of the probe, and the probe can include a narrowed portion for disengaging from the guide bearing at the extended position.

The magnetic clamp for holding the locating coupling together can be arranged adjacent to the locator coupling for exerting a coupling force along the vertical axis. The magnetic clamp can include a first pole piece connected to the probe and a second pole piece connected to the actuator body. At least one of the first and second pole pieces comprises a magnet. Preferably, one of the pole pieces comprises a permanent magnet and the other is made of a ferromagnetic material. The first and second pole pieces are preferably spaced apart at the extended position of the probe through a gap to exert a magnetic clamping force across the gap for clamping the locating coupling together.

BRIEF DESCRIPTION OF THE DRAWING FIGURES

FIGS. 6A and 6B are side elevation views of an alternative probe deployment mechanism shown in extended and retracted positions respectively.

DETAILED DESCRIPTION OF THE INVENTION

Figure 1:
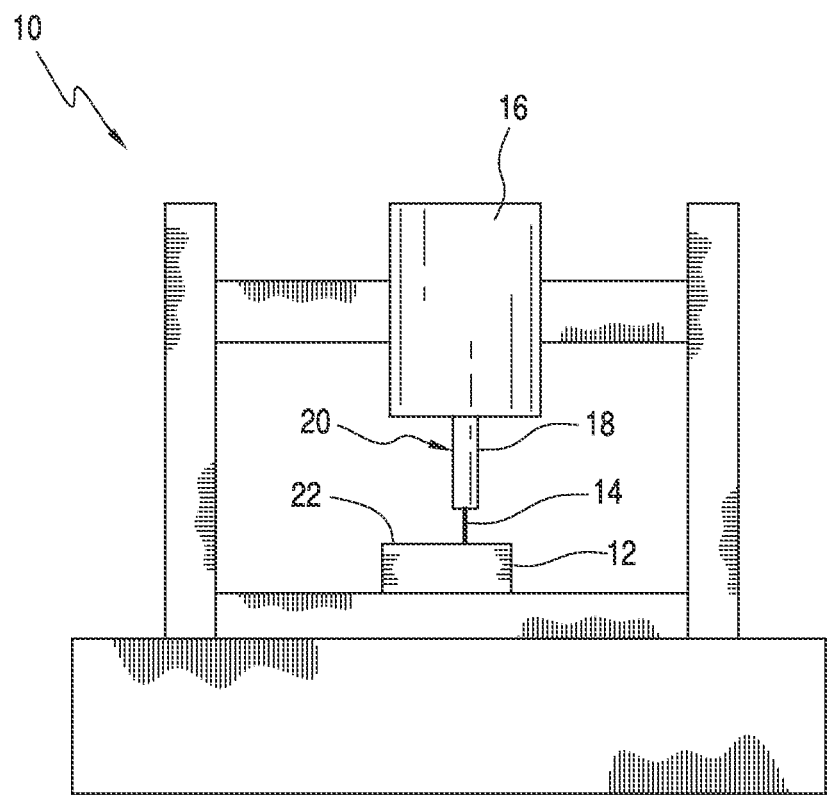
FIG. 1 is a schematic diagram of a coordinate measuring machine adapted to the purposes of the invention.

Depicted in FIG. 1 is a coordinate measuring machine 10 of a type including multiple axes of recordable relative motion for measuring a test object 12 with a measuring probe 14. Projecting downwardly from an overhead carriage 16, which is arranged for traversing one or more of the axes of relative motion, is an actuator body 18 of a probe deployment mechanism 20 (see FIG. 2) for displacing the probe 14 between retracted and extended positions. As shown in FIG. 1, the probe 14 is depicted in an extended position (also referred to as a "deployed position") in contact with a surface 22 of the test object 12 for collecting a succession of measured points along the test object surface 22.

Figure 2:
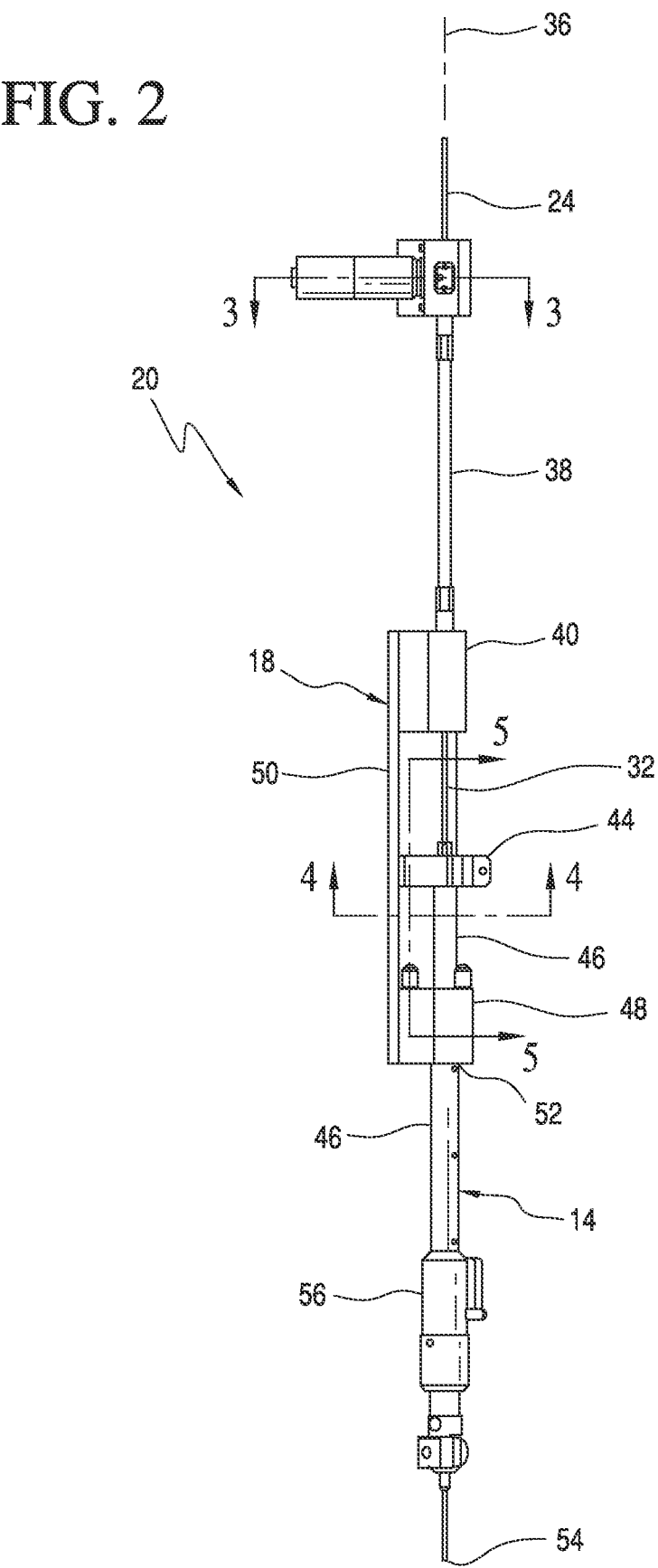
FIG. 2 is a side elevation view of a probe deployment mechanism for use with the coordinate measuring machine of FIG. 1.
Figure 3:
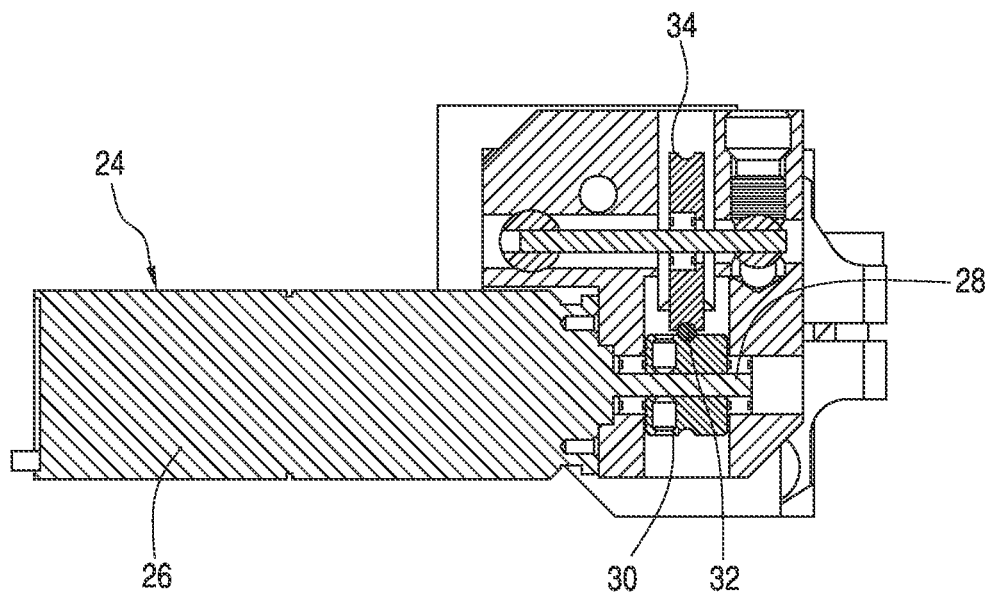
FIG. 3 is a plan cross-sectional view of a cable drive for use with the probe deployment mechanism taken along line 3-3 of FIG. 2.

The probe deployment mechanism 20 as depicted in FIG. 2 includes an overhead cable drive 24 for translating the probe 14 along a vertical axis 36 of the actuator body 18 between the retracted and extended positions. The cable drive 24, which is shown in more detail in FIG. 3, includes a drive motor 26 with a drive pulley 30 coupled to a drive shaft 28 of the motor 26 for engaging a drive cable 32 between the drive pulley 30 and an idler pulley 34. The drive cable 32, which is entrapped between the two pulleys 30 and 34, is translated along the vertical axis 36 in the up or down directions by rotating the drive motor 26 in one direction or the other. Thus, the cable drive 24 incorporates a rotary-to-linear convertor.

A hollow column 38 (see FIG. 2) connects the drive motor 26 and rotary-to-linear convertor above an upper portion 40 of the actuator body 18 for guiding the drive cable 32 through an aperture in the upper portion 40 of the actuator body 18. The drive cable 32 extends through the aperture into engagement with a clamp 44 secured to a probe holder 46 of the probe 14. A lower portion 48 of the actuator body 18, which is connected to the upper portion 40 of the actuator body 18 by one or more uprights 50 (e.g., pillars, angle brackets, or plates) includes a guide bearing 52 that limits translation of the probe holder 46 to translations up or down in along the vertical axis 36. A replaceable probe tip 54 is connected to the probe holder 46 though a sensor coupling 56 for monitoring deflections or other motions of the probe tip 54.

The probe 14, which is otherwise displaceable under the biasing force in gravity drive toward the extended position, is suspended under tension from the drive cable 32. Rotation of the drive motor 26 displaces the probe 14, via its connection to the drive cable 32, up or down along the vertical axis 36. For example, one direction of drive motor rotation raises the probe 14 toward the upper portion 40 of the actuator body 18 to the retracted position, and the other direction of drive motor rotation lowers the probe 14 toward the lower portion 48 of the actuator body 18 to the extended position.

Figure 4:
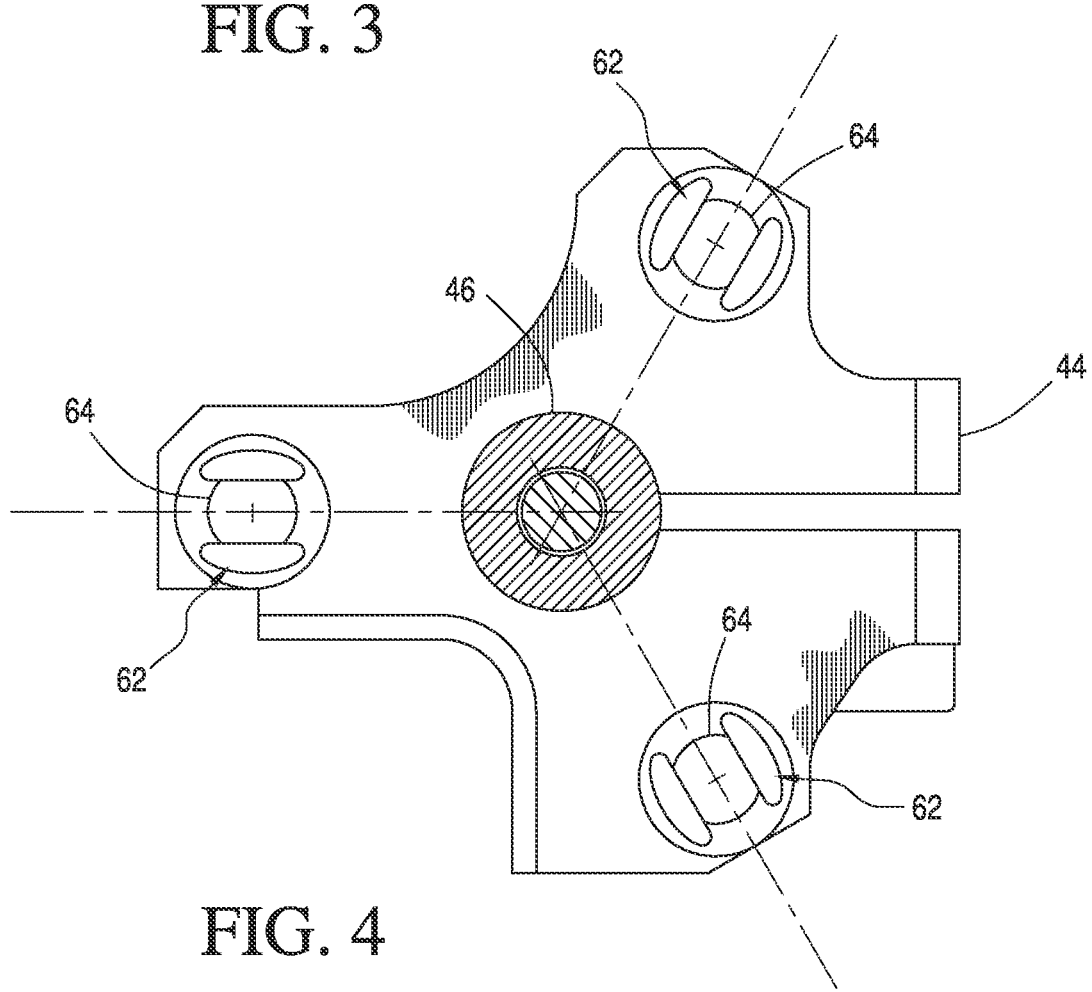
FIG. 4 is a bottom view of a clamp connecting the cable drive to an actuator body and providing an upper mating portion of the locator coupling.
Figure 5:
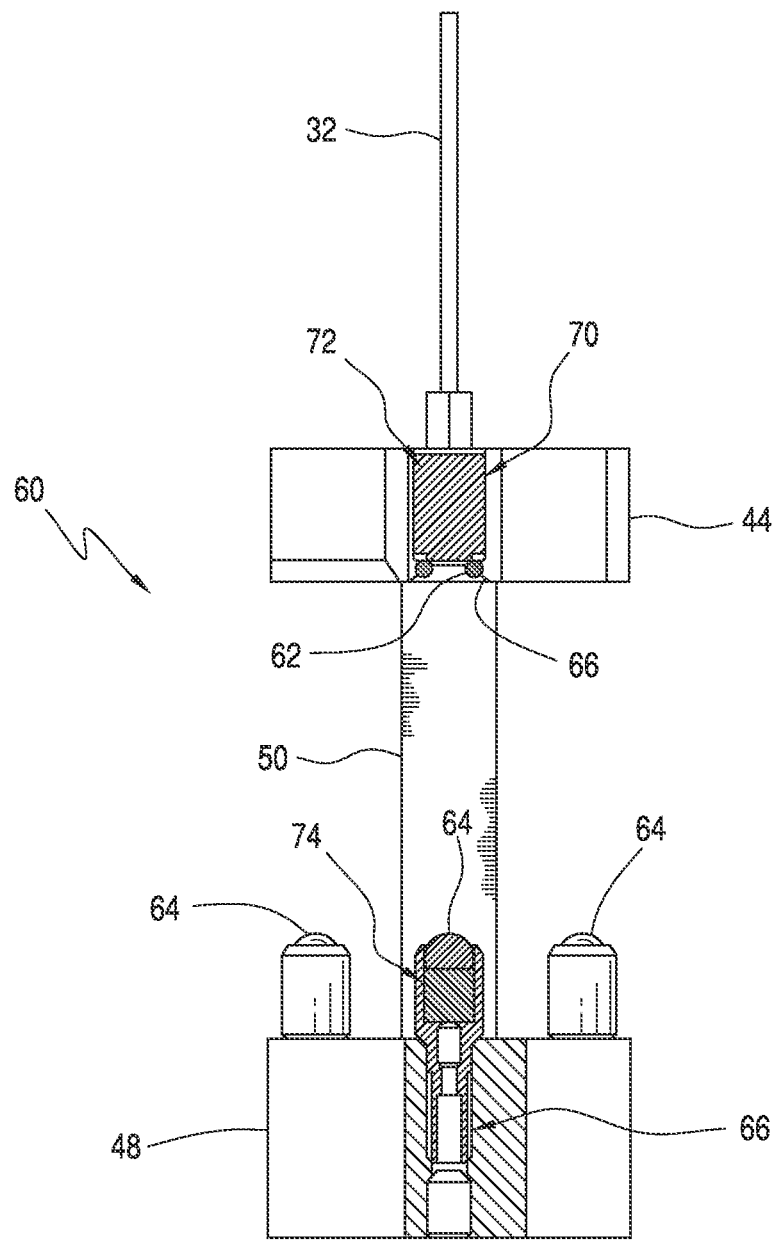
FIG. 5 is an enlarged side view of the locator coupling.

The clamp 44, as shown in FIGS. 4 and 5, includes a first set of locating features, i.e., three pairs of dowel pins 62, functioning together with a second set of mating locating features, i.e., three hemispheres 64, supported on the lower portion 48 of the actuator body 18 to form a locator coupling 60. At the extended position of the probe 14, the locator coupling 60 is engaged for both constraining further movement of the probe 14 with respect to the actuator body 18 and accurately locating the probe 14 with respect to the actuator body 18.

As best seen in FIG. 5, the dowel pins 62 are captured within grooves 66 formed in the clamp 44 to form the upper mating portion of the locator coupling 60, and the hemispheres 64 are supported by screws 66 anchored in the lower portion 48 of the actuator body 18 to form the lower mating portion of the locator coupling 60. Both the three pairs of dowel pins 62 and the three hemispheres 64 are equiangularly spaced through 120 degrees around the vertical axis 36 and at the same radial distance from the vertical axis 36 (see FIG. 4). When engaged, such as under the weight of the probe 14, the locator coupling 60 preferably functions as a kinematic coupling, constraining all six degrees of relative motion along three orthogonal axes of rotation and three orthogonal axes of translation between the probe 14 and the actuator body 18. The three pairs of dowel pins 62 and the three hemispheres 64 can be arranged in different angular and radial positions to provide the desired constraints, and other coupling arrangements can be used to constrain fewer degrees of freedom in accordance with the objectives of the locator coupling 60.

For securing the locator coupling 60 together, a magnetic clamp 70 straddles the locator coupling 60 in the vertical direction by including a first set of pole pieces 72 connected to the probe 14 and a second set of pole pieces 74 connected to the actuator body 18. At least one of the sets of pole pieces 72 and 74 is formed by a set of magnets, and the other set of pole pieces 72 or 74 (if not magnets of opposite polarity themselves) is made of a ferromagnetic material or other material attracted to the magnets. Preferably, one of the sets of pole pieces is formed by permanent magnets and the other of the sets of pole pieces is formed by a ferromagnetic material. The pole pieces 72 are shown in positions immediately above each of the pairs of dowel pins 62 within recesses formed in the clamp 44, and the pole pieces 74 are shown in positions immediately below the hemispheres 64 and supported together with the hemispheres 64 by the screws 66. The dowel pins 62 and the hemispheres 64 can be made of a magnetically permeable material for providing magnetic contact between the dowel pins 62 and the hemispheres 64, or one or both of the dowel pins 62 and the hemispheres 64 can be made of a magnetically reluctant material to provide an effective gap between the pole pieces 72 and 74 to reduce or otherwise adjust the strength of the magnetic clamping force.

For moving the probe 14 to the extended (deployed) position, the cable drive 24 can be operated in conjunction with the force of gravity to lower the probe 14 together with the clamp 44 through a first distance until the pairs of dowel pins 62 of the clamp 44 engage the respective hemispheres 64 of the lower portion 48 of the actuator body 18 for engaging the locator coupling 60. The magnetic clamp 70 secures the locator coupling 60 together at the extended position of the probe 14 for accurately coupling the probe 14 together with the actuator body 18. The periphery of the clamp 44 is preferably shaped in relation to the upright 50 to retain the probe 14 in approximately the same angular orientation about the vertical axis 36 to maintain the same angular relationships between the pairs of dowel pins 62 and the respective hemispheres 64 to assure proper engagement of the locator coupling 60.

For avoiding further influence of the cable drive 24 on the probe 14 at the extended position of the probe 14, the cable drive 24 can be overdriven in the same direction through second distance for effectively releasing the cable drive 24 from the probe 14. Preferably, the drive cable 32 is light weight and flexible with little resiliency so that slack is formed in the drive cable 32 when the cable drive 24 is overdriven. When slack, the drive cable 32 is no longer under tension and is otherwise kinetically isolated from the probe 14.

In addition, the probe holder 46 is preferably narrowed in the vicinity of the clamp 44 so that when the locator coupling 60 is engaged at the extended position of the probe 14, the probe holder 46 is also out of engagement with the guide bearing 52 within the lower portion 48 of the actuator body 18. Thus, the only remaining physical connection between the probe 14 and the actuator body 18 is within the locator coupling 60.

For retracting the probe 14, the cable drive 24 can be driven in the opposite direction to take up the slack, to overcome the magnetic clamping force for disengaging the locator coupling 60, and to raise the probe 14 against the force of gravity to the retracted position. Thus, once the slack in the drive cable 32 is taken up, the drive cable 32 is placed in tension and the cable drive 24 exerts a counteracting force that overcomes both the magnetic clamping force and the force of gravity for raising the probe 14. As the probe is vertically translated, the remaining wider portion of the probe holder 46 reengages the guide bearing 52 for maintaining the probe 14 in a position aligned with and centered about the vertical axis 36.

FIGS. 6A and 6B depict another probe deployment mechanism 80 in both extended (deployed) and retracted positions. Components of the probe deployment mechanism 80 in common with the probe deployment mechanism 20 of FIGS. 1-5 share the same reference numerals.

Instead of using a cable drive to raise and lower the probe 14, the probe deployment mechanism 80 uses a screw drive 82. The screw drive 82 includes a drive motor 84 having a vertically oriented drive shaft (not shown) coupled to a lead screw 86. The aperture in the upper portion 40 of the actuator body 18 provides clearance for the lead screw 86 to extend through the upper portion 40 and into engagement with a drive nut 88 that is captured within a modified probe holder 90.

Figures 7A, 7B:
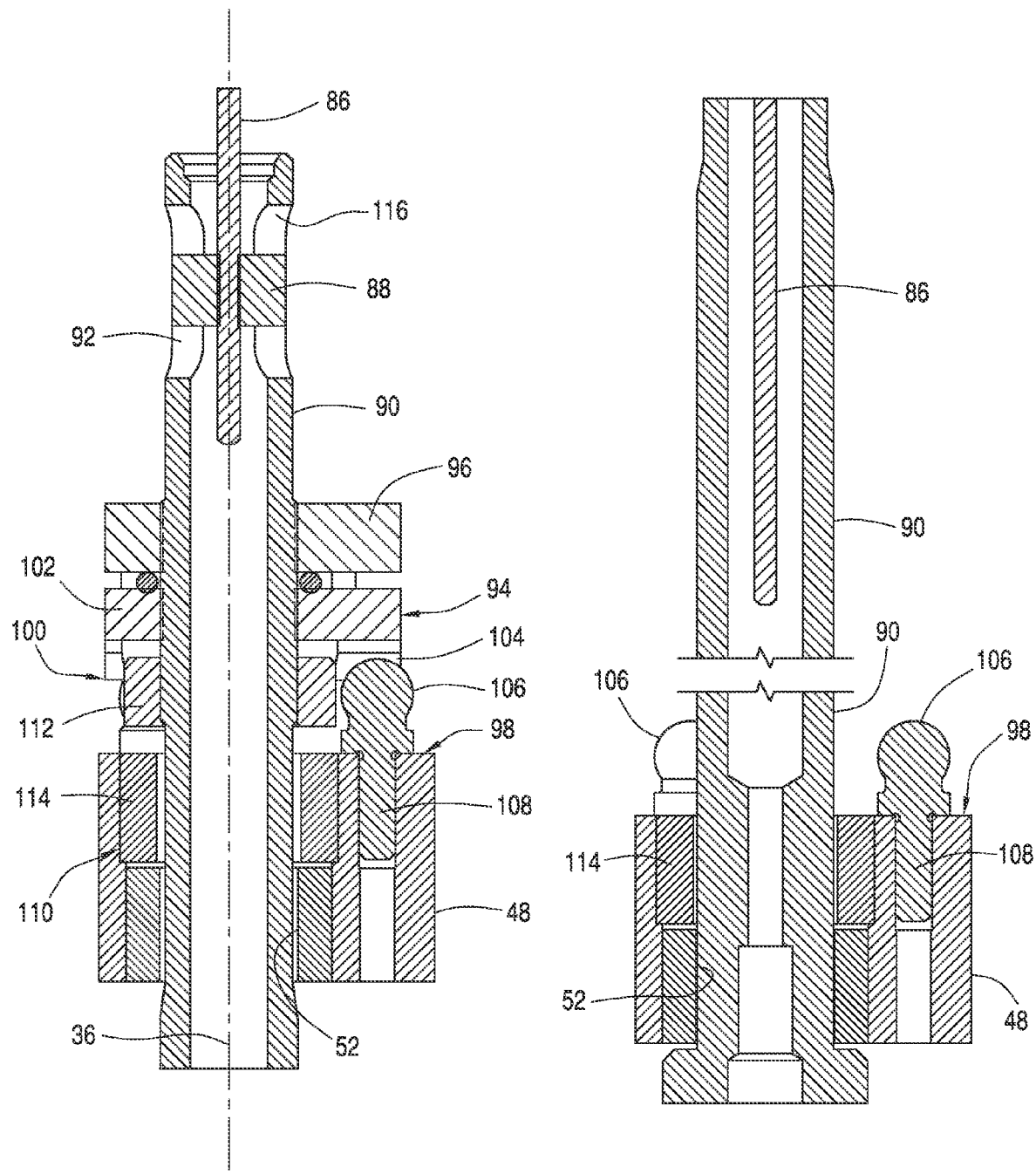
FIGS. 7A and 7B are enlarged side cross-sectional views of a probe holder and locator coupling of the alternative probe deployment mechanism at respective engaged and disengaged positions.
Figure 9:
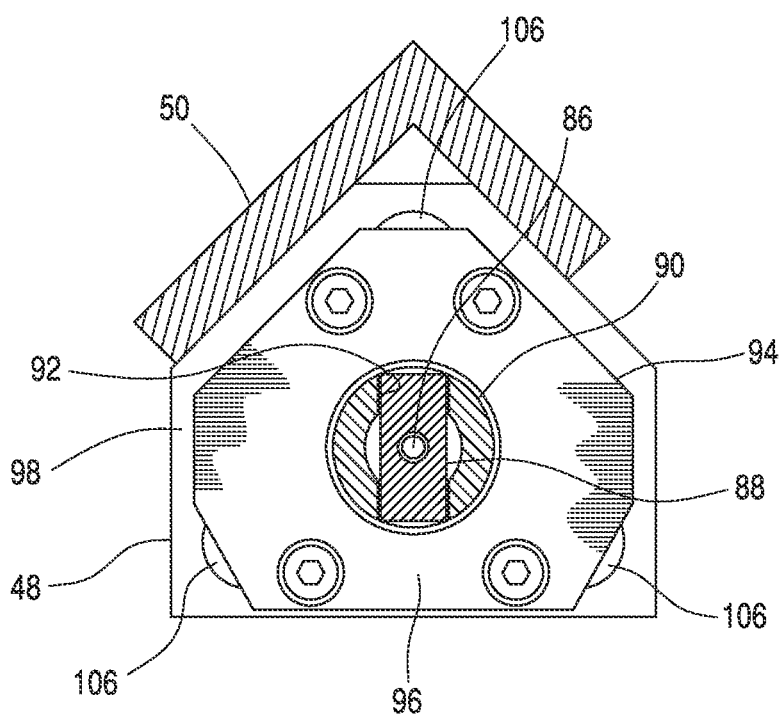
FIG. 9 is a top view of a locking nut together with the upper mating portion of the locator coupling above the lower mating portion of the locator coupling that is fixed to the upright of the actuator body shown in cross section.

As shown more clearly in FIG. 7A, the drive nut 88 is captured within a slot 92 formed through an upper portion of the probe holder 90. The slot 92 is shaped to limit rotation of the drive nut 88 but still includes some rotational clearance so that the drive nut 88 loosely fits within the slot 92. As shown in FIG. 9, both the drive nut 88 and the slot 92 have generally rectangular shapes to limit rotation. In addition, the slot 92 has a length along the vertical axis 36 that exceeds the thickness (height) of the drive nut 88 to permit a limited amount of translation between the drive nut 88 and the probe holder 90.

A portion of the length of the probe holder 90 is threaded to receive an upper coupling component 94 of a locator coupling 100 and a locking nut 96 for securing the upper coupling component 94 in place along the probe holder 90. The upper coupling component 94 can be rotatively adjusted (up or down) along the threads of the probe holder 90 to a new axial position along the probe holder 90, and the locking nut 96 can be tightened to lock the upper coupling component 94 in place against the probe holder 90. The axial position of the upper coupling component 94 along the probe holder 90 controls the length of the probe 14 extending from the actuator body 18 at the deployed (extended) position of the probe 14.

A lower coupling component 98 of the locator coupling 100 is supported on the lower portion 48 of the actuator body 18. Similar to the preceding embodiment the lower portion 48 of the actuator body 18 includes a guide bearing 52 for centering and aligning the probe holder 90 with the vertical axis 36 throughout all but the lower portion of the intended length of travel of the probe holder 90. For example, as shown in FIG. 7B, the probe holder 90 has a diameter along much of its length sized to engage the guide bearing 52.

Figure 8:
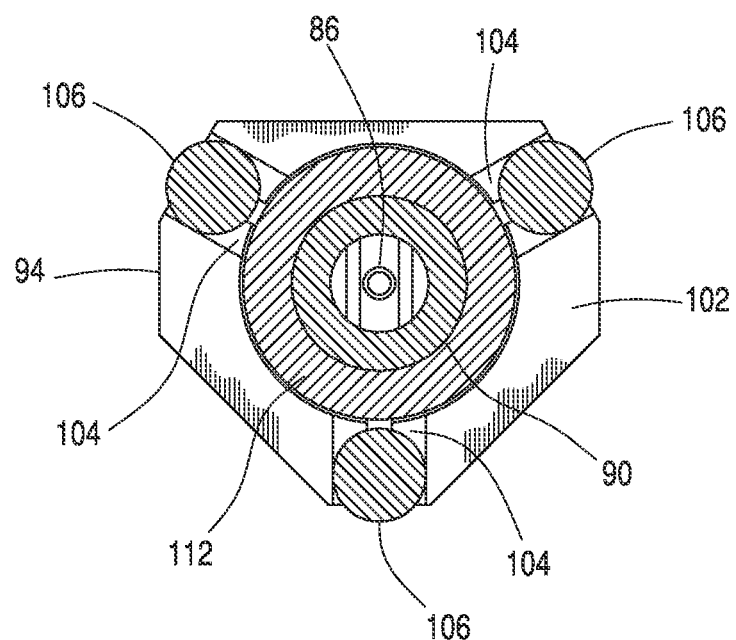
FIG. 8 is a bottom view of an upper mating portion of the locator coupling.

As can be seen in FIG. 8, the upper coupling component 94 includes a coupler body 102 having three radial V-shaped slots 104 that are equiangularly spaced around the vertical axis 36. The lower coupling component 98 includes three similarly equiangularly spaced tooling balls 106 at equal radial distances from the vertical axis 36. The tooling balls 106 include integral stems 108 that are embedded within the lower portion 48 of the actuator body 18. The three V-shaped slots 104 contact the three tooling balls 106 for engaging the locator coupling 100 at the extended position of the probe 14.

A magnetic clamp 110 includes an upper pole piece 112 carried by the probe holder 90 adjacent to the upper coupling component 94 and a lower pole piece 114 embedded within the lower portion 48 of the actuator body 18 adjacent to the lower coupling component 98. At least one of the pole pieces 112 and 114 is preferably a magnet, and the other of the pole pieces 112 or 114, if not a magnet itself, is made of a ferromagnetic material or other material that is attracted to the magnet. Forming both pole pieces 112 and 114 as magnets is generally less preferred because the magnet poles of the two magnets may have their own preferred axial alignment position, which could be different from the position at which the upper and lower coupling components 94 and 98 are seated. Thus, for the purpose of reducing extraneous forces at the locator coupling 100, one of the pole pieces 112 and 114 is preferably a permanent magnet and the other of the two pole pieces 112 or 114 is preferably made of a ferromagnetic material.

At the engaged position of the locator coupling 100 as shown in FIG. 7A, the pole pieces 112 and 114 are spaced apart along the vertical axis, thereby creating a gap across which the magnetic force between the pole pieces 112 and 114 acts to clamp the upper and lower coupling component 94 and 98 together. The pole pieces 112 and 114 are shaped to exert a clamping force in the direction of the optical axis 36 that is balanced between each of the three engagements between the V-shaped slots 104 and the tooling balls 106 to uniformly load the locator coupling 100.

The magnitude of the magnetic clamping force can be varied by adjusting the axial position of the upper pole piece 112 along the length of the probe holder 90. For example, the upper pole piece 112 can be threadably engaged with the probe holder 90 (similar to the upper coupling component 94 and locking nut 96) and rotatively adjusted (up or down) along the threads of the probe holder 90 to a new axial position along the probe holder 90. Set screws extending through the upper pole piece 112 into engagement with the probe holder 90 can be used to secure the upper pole piece 112 in place along the probe holder 90. The adjustment of the axial position of the upper pole piece 112 along the probe holder 90 sets a new gap between the upper and lower pole pieces 112 and 114 along the optical axis 36 at the engaged position of the locator coupling 100. By increasing the size of the gap, the magnetic clamping force across the upper and lower coupling component 94 and 98 can be lowered, and by decreasing the size of the gap, the magnetic clamping force can be raised. Preferably, the clamping force is adjusted to provide enough clamping force to securely hold the probe 14 in place with respect to the actuator body 18 during anticipated use without over compressing or distorting the locator coupling 100.

For retracting the probe 14 from its deployed position, the drive motor 84 of the probe deployment mechanism 80 is engaged for rotating the lead screw 86. The drive nut 88, whose rotation is restricted by the slot 92 in the upper portion of the probe holder 90, translates vertically along the length of the slot 92 into contact with an upper end 116 of the slot 92. Despite engaging the upper end 116 of the slot 92, the drive nut 88 continues to translate vertically with the further rotation of the lead screw 86 and lifts the probe holder 90 thereby disengaging the locator coupling 100. Initially the drive motor 84 exerts enough torque to impart sufficient tension along the lead screw 86 to overcome both the magnetic clamping force and the force of gravity acting on the entire mass of the probe 14. Yet further rotation of the lead screw 86 lifts the probe 14 against the force of gravity to a retracted position at which the locking nut 96 is located adjacent to the upper portion 40 of the actuator body 18 as shown in FIG. 6B. The clearance aperture in the upper portion 40 of the actuator body 18 is sized to receive the upper portion of the probe holder 90 up to the locking nut 96 to maximize the distance through which the probe 14 can be retracted.

For extending the probe 14 from its retracted position, the drive motor 84 is rotated in the opposite direction. The rate of descent by which the probe 14 is lowered is controlled by the speed at which the drive motor 84 is rotated. Although the probe holder 90 is engaged with the guide bearing 52 for maintain the probe 14 in a vertical orientation, the probe descends under the force of gravity. The threaded connection between the lead screw 86 and the drive nut 88 remains in tension to slow the rate of descent otherwise imparted to the probe 14 by gravity. Thus, the drive nut 88 remains in contact with an upper end 116 of the slot 92 during the descent.

As the upper coupling component 94 of a locator coupling 100 approaches the lower coupling component 98, the probe holder 90 is released from the guide bearing 52 and tension on the lead screw 86 is increased by the magnetic clamp 110 until the upper coupling component 94 is seated on the lower coupling component 98.

For disengaging the screw drive 82 from the probe holder 90, the screw drive 82 is overdriven in the direction of descent, which translates the drive nut 88 out of engagement with the upper end 116 of the slot 92 in the probe holder 90 to a position approximately centered along the length of the slot 92 as shown in FIG. 7A. The further translation of the drive nut 88 out of engagement with the probe holder 90 relieves any tension in the lead screw 86 previously imparted by the force of gravity acting on the probe 14. Any torque imparted by the threaded connection to the drive nut 88 is similarly relieved. Thus, the disengagements of both the guide bearing 52 and the screw drive 90 from the probe holder 90 at the extended (deployed) position kinetically isolates the connection between the probe holder 90 and the actuator body 18 at the locator coupling 100.

Figure 10:
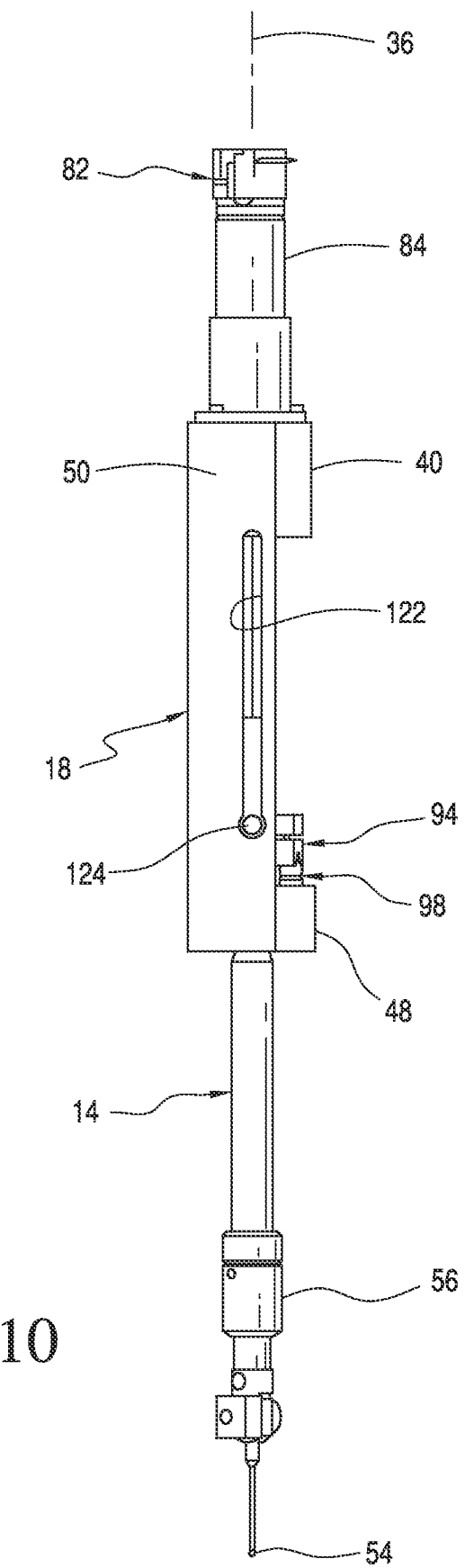
FIG. 10 is another side elevation view of the alternative probe deployment mechanism of FIGS. 6A and 6B showing a guide slot for rotationally stabilizing the probe.

With reference to FIG. 10, the relative rotational orientation between the upper coupling component 94 and the lower coupling component 98 can be maintained along the length of probe travel by a guide slot 122 in the upright 50 of the actuator body 18 and a guide pin 124 extending from the upper coupling component 94 or other component of the probe 14. During most of the length of travel of the probe 14, a periphery of the guide pin 124 engages the guide slot 122 to constrain rotation of the probe 14 about the vertical axis 36. However, similar to the guide bearing 52, the relative guide pin 124 is preferably disengaged from the guide slot 122 at the extended position of the probe 14 to isolate the locator coupling 100 from further physical constraints. For example, the width of the guide slot 122 can be enlarged at the extended position.

Figures 11A, 11B:
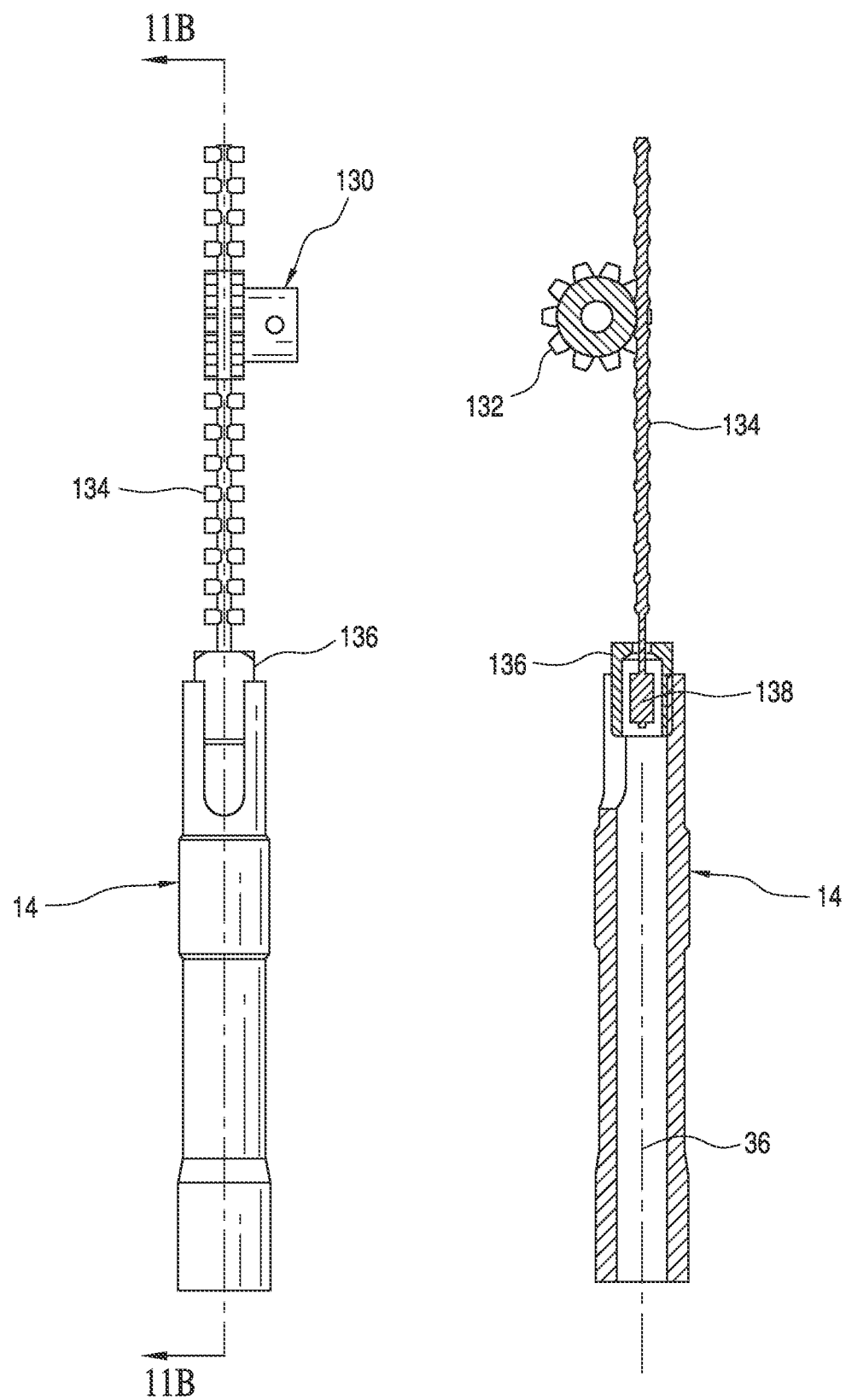
FIGS. 11A and 11B are side elevation views of a drive mechanism of an alternative laddered drive for raising and lowering the probe.

Another drive useful for raising and lowering the probe 14 is depicted in FIGS. 11A and 11B. The depicted drive is a laddered drive 130, including a drive motor (not shown) that rotates a drive cog in the form of a cog wheel 132 in engagement with a laddered rope 134 for raising and lowering the laddered rope. A swaged cylinder 136 fitted into engagement with the top of the probe 14 receives a cylindrical plug 138 that is suspended from the laddered rope 134 through an aperture in the top of the swaged cylinder 136. Although otherwise freely rotatable and translatable along the vertical axis 36, the plug 138 is drawn into engagement with the top of the swaged cylinder 136 by gravity acting on the probe 14 or by tension imparted by the laddered rope 134. When the probe 14 has settled into its deployed position by the engagement of the locator coupling 100, the laddered drive 130 can be overdriven for further lowering the plug 138 and thereby disengaging the plug 138 from the swaged cylinder 136 attached to the probe 14.

Figure 12A:
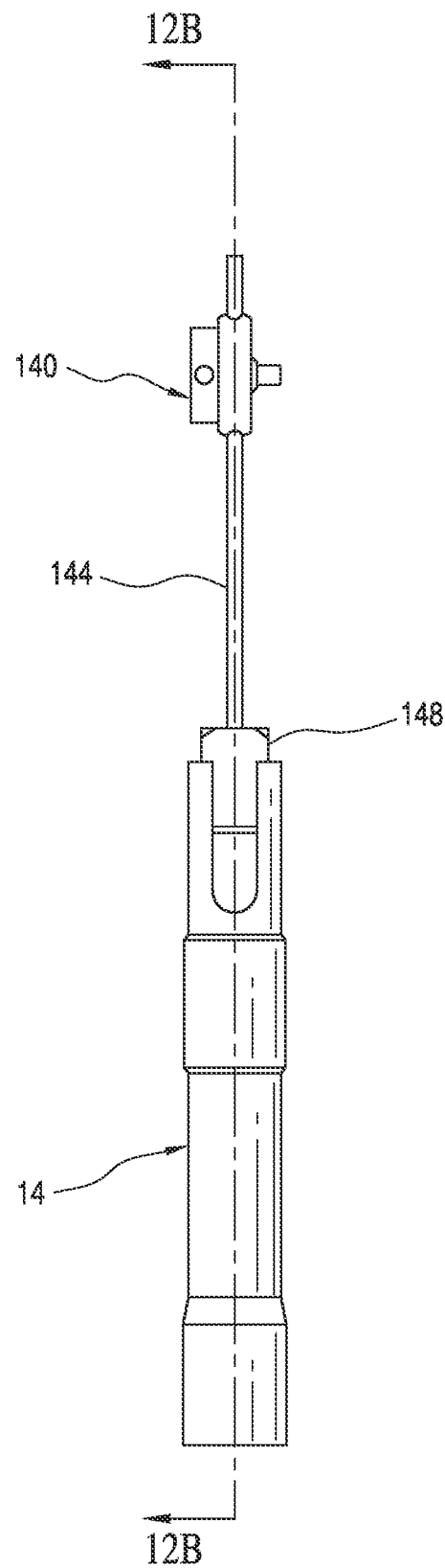
FIGS. 12A and 12B are side elevation views of a drive mechanism of an alternative rod drive for raising and lowering the probe.
Figure 12B:
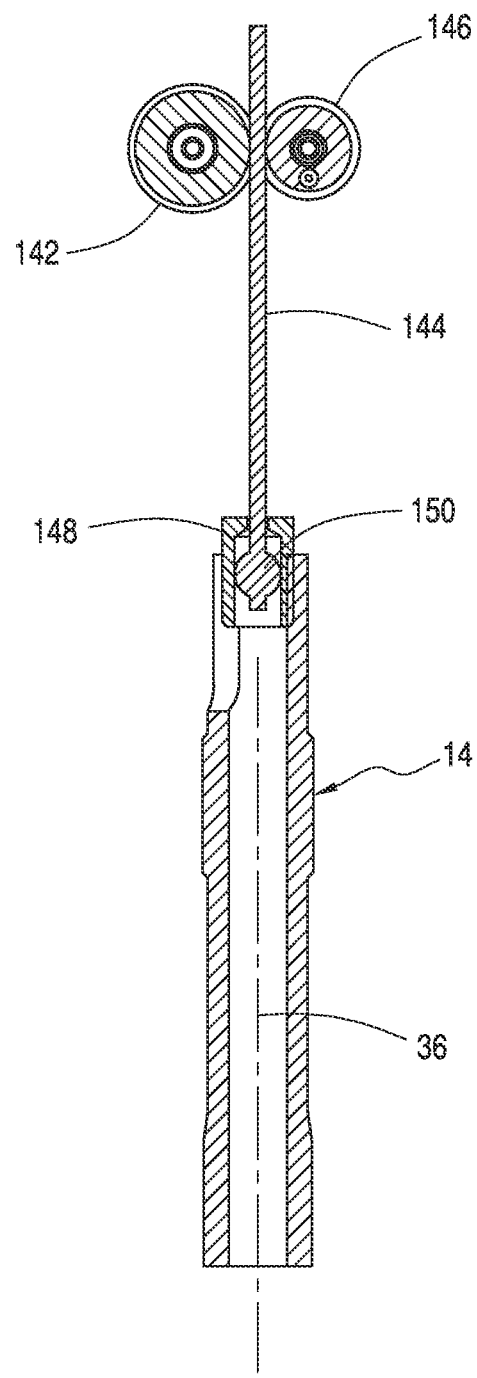

Yet another drive useful for raising and lowering the probe 14 is depicted in FIGS. 12A and 12B. The depicted drive is a rod drive 140, including a drive motor (not shown) that rotates a drive pulley 142. A drive rod 144, which is frictionally engaged between the drive pulley 142 and an idler pulley 146, is raised or lowered by the rotation of the motor and drive pulley 142. Similar to the laddered drive 130, a swaged cylinder 148 fitted into engagement with the top of the probe 14 receives a spherical plug 150 that is suspended from the drive rod 144 through an aperture in the top of the swaged cylinder 148. The spherical plug 150, which is otherwise freely rotatable and translatable along the vertical axis 36, is drawn into engagement with the top of the swaged cylinder 148 by gravity acting on the probe 14 or by tension imparted by the drive rod 144. When the probe 14 has settled into its deployed position by the engagement of the locator coupling 100, the rod drive 140 can be overdriven for further lowering the plug 150 and thereby disengaging the plug 150 from the swaged cylinder 148 attached to the probe 14.

Thus, regardless of the mode by which the drive raises or lowers the probe 14, the locator coupling 60, 100 is kinetically isolated from the drive 24, 82, 130, 140 at the deployed (extended) position of the probe 14. In addition, the locator coupling 60, 100 is also preferably kinetically isolated at the deployed (extended) position of the probe 14 from the guides 52, 122 that otherwise maintain the probe 14 in alignment with and in a given rotational position around the vertical axis 36 throughout the remaining length of probe travel between the extended and retracted positions of the probe 14. Only the locator coupling 60, 100 together with its preload by way of the magnetic clamp 70, 110 preferably connect the probe 14 to the actuator body 18 to provide for taking more repeatable measurements with the probe 14.

While described in detail with respect to two preferred embodiments, those of skill in the art will appreciate the improvements taught by the disclosed invention can be carried out using a variety of devices and arrangements among components in keeping with the overall teaching of the invention.

The invention claimed is:
1. A probe deployment mechanism for a coordinate measuring machine comprising:
an actuator body arranged for connection to a measuring machine;
a probe being displaceable with respect to the actuator body between extended and retracted positions;
a locator coupling that is engageable in the extended position of the probe for constraining movement of the probe with respect to the actuator body; and a drive releasably coupled to the probe for displacing the probe between the extended and retracted positions so that in the extended position, the drive is kinetically isolated from the probe.

2. The deployment mechanism of claim 1 in which the drive is arranged to be driven in a first direction through a first distance that permits the probe to be displaced from the retracted position to the extended position at which the locator coupling is engaged to prevent further displacement of the probe in the first direction, and the drive is overdriven in the first direction at the extended position of the probe through second distance that would otherwise permit further displacement of probe in the first direction for releasing the drive from the probe.

3. The deployment mechanism of claim 1 in which a biasing force urges the probe toward the extended position, and the drive exerts a counteracting force on the probe for controlling a rate at which the probe is displaced between the extended and retracted positions.

4. The deployment mechanism of claim 3 in which the locator coupling includes a first coupling component attached to the probe and a second coupling component attached to the actuator body, and the biasing force urges the first and second coupling components together at the extended position of the probe.

5. The deployment mechanism of claim 3 in which the drive is releasable from the probe to avoid counteracting or contributing to the biasing force at the extended position of the probe.

6. The deployment mechanism of claim 1 in which the locator coupling includes a first mating coupling component connected to the probe and a second mating coupling component connected to the actuator body, and further comprising a magnetic clamp for holding the first and second mating coupling components together.

7. The deployment mechanism of claim 6 in which the magnetic clamp includes a first pole piece connected to the probe and a second pole piece connected to the actuator body, wherein one of the first and second pole pieces comprises a magnet and the other of the first or second pole pieces is made of a ferromagnetic material.

8. The deployment mechanism of claim 7 in which the first and second pole pieces are spaced apart through a gap in the extended position of the probe to exert a magnetic clamping force across the gap for clamping the first and second mating coupling components together without further mechanically connecting the first and second mating coupling components.

9. The deployment mechanism of claim 8 in which at least one of the connections between the first pole piece and the probe and between the second pole piece and the actuator body is adjustable for varying the spacing between the first and second pole pieces in the extended position to adjust the magnetic clamping force between the first and second mating coupling components.

10. The deployment mechanism of claim 8 in which the drive provides for overcoming the magnetic clamping force for disengaging the locator coupling.

11. The deployment mechanism of claim 1 further comprising a guide bearing connected to the actuator body for confining translation of the probe to a single axis throughout a first portion of a range of motion between extended and retracted positions while being disengaged from the probe at the extended position for kinetically isolating the probe from the guide bearing.

12. The deployment mechanism of claim 11 in which the guide bearing engages a periphery of the probe, and the probe includes a narrowed portion for disengaging from the guide bearing at the extended position.

13. The deployment mechanism of claim 1 further comprising a guide pin connected to the probe and a guide slot in the actuator body receiving the guide pin for confining rotation of the probe throughout a first portion of a range of motion between extended and retracted positions while being disengaged from the pin at the extended position for kinetically isolating the probe from the guide slot.

14. The deployment mechanism of claim 13 in which the guide slot engages a periphery of the drive pin, and the guide slot includes a widened portion for disengaging from the guide pin at the extended position.

15. The deployment mechanism of claim 1 in which the drive includes a screw drive comprising a motor, a lead screw rotated by the motor, and a drive nut threadably engaged with the lead screw and releasably engaged with the probe.

16. The deployment mechanism of claim 1 in which the drive includes a cable drive comprising a motor, a drive pulley rotated by the motor, and a drive cable engaged by the drive pulley and connected to the probe.

17. The deployment mechanism of claim 1 in which the drive includes a ladder drive comprising a motor, a drive cog rotated by the motor, and a laddered rope engaged with the drive cog and releasably engaged with the probe.

18. The deployment mechanism of claim 1 in which the drive includes a rod drive comprising a motor, a drive pulley rotated by the motor, and a rod engaged with the drive pulley and releasably engaged with the probe.

19. A coordinate measuring machine having a probe deployment mechanism comprising:
an actuator body arrange for recordable relative movement with respect to a test object;
a probe being displaceable with respect to the actuator body between extended and retracted positions;
a locating coupling for constraining movement of the probe with respect to the actuator body at the extended position of the probe; and
a drive releasably coupled to the probe for displacing the probe between the extended and retracted positions so that in the extended position, the drive is kinetically isolated from the probe.

20. The measuring machine of claim 19 in which the probe is displaceable along a vertical axis, and the drive suspends the probe from the actuator body along the vertical axis under tension.

21. The measuring machine of claim 20 in which the drive is arranged to be overdriven in the extended position for relieving the tension between the drive and the probe.

22. The measuring machine of claim 19 further comprising a guide bearing connected to the actuator body for confining translation of the probe to a single vertical axis throughout a first portion of a range of motion between extended and retracted positions while being disengaged from the probe at the extended position for kinetically isolating the probe from the guide bearing.

23. The measuring machine of claim 22 in which probe is suspended from the drive so that the tension between the drive and the probe is imparted by gravity during the displacement of the probe through at least a portion of a range of motion from the retracted position to the extended position.

24. The measuring machine of claim 19 further comprising a magnetic clamp adjacent to the locator coupling for exerting a clamping force in the direction of probe displacement, the magnetic clamp including a first pole piece connected to the probe and a second pole piece connected to the actuator body, wherein one of the first and second pole pieces comprises a magnet and the other of the first or second pole pieces is made of a ferromagnetic material.

25. The measuring machine of claim 24 in which the first and second pole pieces are spaced apart at the extended position of the probe through a gap to exert a magnetic clamping force across the gap for clamping the locating coupling together.

26. The measuring machine of claim 22 in which the drive includes a rotary motor and a rotary-to-linear converter for imparting the tension along the vertical axis between the drive and the probe.

27. The measuring machine of claim 22 in which the probe includes a probe holder and a probe tip connected to the probe holder for contacting the test object, the guide bearing being arranged to engage a periphery of the probe holder, and the probe holder including a narrowed portion for disengaging from the guide bearing at the extended position.

28. The measuring machine of claim 19 further comprising a guide pin connected to the probe and a guide slot in the actuator body receiving the guide pin for confining rotation of the probe throughout a first portion of a range of motion between extended and retracted positions while being disengaged from the pin at the extended position for kinetically isolating the probe from the guide slot.

29. The measuring machine of claim 28 in which the guide slot engages a periphery of the drive pin, and the guide slot includes a widened portion for disengaging from the guide pin at the extended position.

* * * * *